United States Patent [19]

Myers et al.

[11] 3,783,470

[45] Jan. 8, 1974

[54] CLEANER FOR TAPE CARTRIDGE PLAYERS

[75] Inventors: Mark Stanley Myers, Cockfosters; Ronald Frederick Bishop, Brookmans Park, both of England

[73] Assignee: Metrosound Manufacturing Company Limited, Waltham Abbey, Essex, England

[22] Filed: Nov. 26, 1971

[21] Appl. No.: 202,514

[30] Foreign Application Priority Data

May 18, 1971 Great Britain .................. 15,458/71

[52] U.S. Cl. ................................ 15/210 R, 274/47

[51] Int. Cl. ............................................ G11b 5/00

[58] Field of Search .................... 15/210 R, 104.94; 224/47; 179/100.2 Z

[56] References Cited

UNITED STATES PATENTS 3,439,922 4/1969 Howard ........................... 15/210 R 3,636,276 1/1972 Rose ............................ 179/100.2 Z 3,655,924 4/1972 Puskas ..................... 179/100.2 Z X

*Primary Examiner*—Leon G. Machlin

*Attorney*—William A. Drucker

[57] ABSTRACT

The invention provides a device, for cleaning tape-coacting operative portions of a magnetic tape cartridge player of that kind which includes at least a cartridge-receiving passage in which said operative portions are disposed and which may further include means for retaining a cartridge in fully inserted position in said cartridge-receiving passage, said device comprising a body adapted for insertion into said cartridge-receiving passage of said player, said body having cleaning means disposed adjacent to an end thereof such that when the body is inserted in said cartridge-receiving passage with said cleaning means at the leading end of said body said cleaning means become positioned for and can pass into abutment with said operative portions of said player, said cleaning means being movable past said operative portions so as to exert a wiping action thereon.

4 Claims, 4 Drawing Figures

CLEANER FOR TAPE CARTRIDGE PLAYERS

This invention relates to a cleaner for tape cartridge players.

A conventional form of magnetic tape cartridge player comprises a housing having a passage for the insertion of a cartridge containing a reel of tape. At the inner end of the passage there are provided one or more heads for coaction with the tape carried in the cartridge, and a capstan driven by an electric motor and adapted to drive the tape, usually by gripping of the tape between the capstan and a pinch wheel in the cartridge. Means are usually provided to coact between the housing and the cartridge to maintain the cartridge firmly, but removably, pressed fully home in the passage, so that the tape is kept in contact with the head(s) and is also gripped, for driving, between the capstan and the pinch wheel. Provision is usually made for the insertion of the cartridge to cause actuation of a microswitch controlling drive to the capstan, such that the capstan commences to rotate as soon as the cartridge has been pushed fully home in the passage.

During the repeated use of such a player, the head(s) and the capstan tend to become soiled with (i) oxide deposits rubbed off the tape, (ii) tape lubricant, usually in the form of silicon graphite, and (iii) dust and other detritus which may find its way into the passage. This results in clogging of the head(s) with resultant loss of frequency response. It also results in deterioration of the driving action of the capstan, as well as soiling of the tape itself.

It is accordingly the object of the present invention to provide a device for cleaning the head(s) and/or the capstan in a simple and convenient manner.

According to the present invention, a device for cleaning the head(s) and/or the capstan of a magnetic tape cartridge player of the general nature described above, comprises a body adapted for insertion into the cartridge-receiving passage of the player, said body having cleaning means disposed adjacent a leading end thereof and positioned for abutment, when the body is in fully inserted position, against the head(s) and/or against the capstan, said cleaning means being movable past the head(s) and/or the capstan so as to exert a wiping action thereon. The body may be adapted for coaction with means in the player for retaining a cartridge in fully inserted position.

In a preferred form, the cleaning means is movable, e.g. reciprocable, approximately along the line of movement of a tape past the head(s) and/or the capstan. By way of example, a reciprocating motion may be imparted manually, and for this purpose the cleaning means may be carried on a reciprocable support which is preferably spring-urged in one direction of reciprocation and is operable manually from the trailing end of the body, e.g. the support may be coupled to a linkage having a finger piece accessible through an opening adjacent to or in the trailing end of the body.

The cleaning means may comprise a flexible wiping element, e.g. a felt strip, of which at least part is advantageously resiliently mounted, e.g. supported on a layer of resiliently-compressible material such as plastics foam.

Provision is advantageously made for supply of liquid cleaning material to the wiping element. For example, where the wiping element is carried directly or indirecly on a support, the support may have a reservoir cavity for cleaning liquid which can pass to the wiping element either directly through passage means in the wall of the rigid support, or through passage means constituted by a sponge material on which the element is resiliently mounted. In a preferred arrangement, the rigid support has a reservoir cavity with an opening which can be sealed by a removable or shiftable closure, and access to that opening is obtainable through an aperture, of appropriately larger dimensions, in the body wall.

In another form, the cleaning means is in the form of or is included in a closed loop mounted slidably on a fixed support and which can be driven past the head(s) and/or the capstan, for example by passing over a pinch wheel adapted to coact with the usual capstan of the player. Such a cleaning means would advantageously have a wiping element which is mounted directly or by means of resilient material on a flexible tape. Preferably such a cleaning means would be caused to pass through a reservoir, or against a dispenser, of a liquid cleaning material. Alternatively, a dry cleaner element of fabric strip could be caused to pass against brushed contacting at least one of its major faces.

In order that the nature of the invention may be readily ascertained, some embodiments thereof are hereinafter particularly described with reference to the accompanying drawings, wherein.

Figure 1:
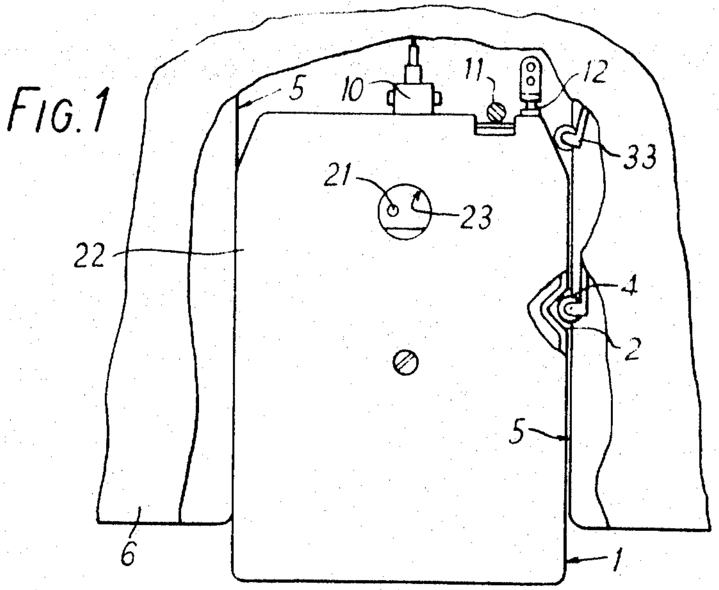
FIG. 1 is a plan view, with a portion shown broken away, of part of a first embodiment of tape cartridge player, with a cleaning device inserted in the usual playing position for a cartridge.
Figure 2:
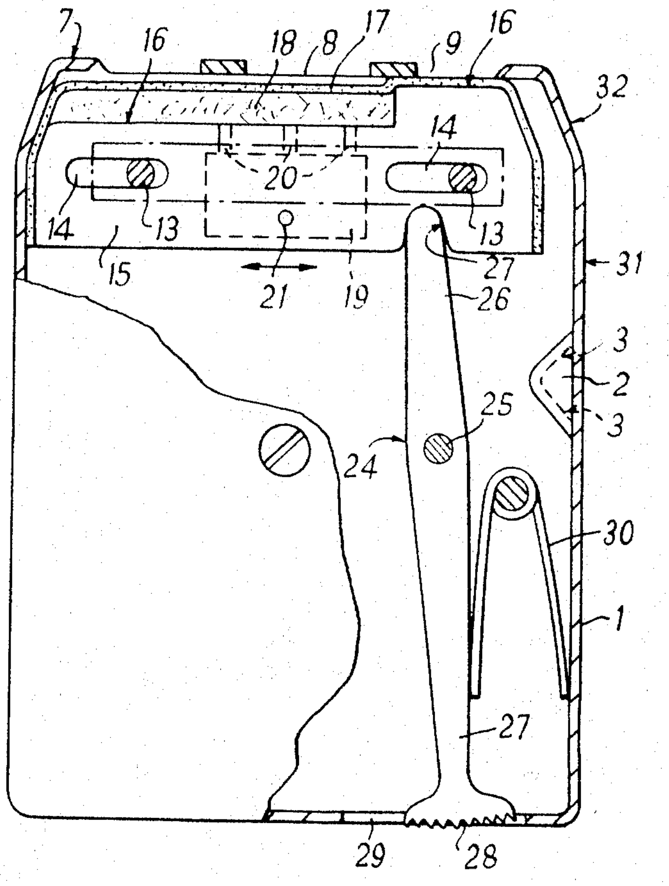
FIG. 2 is a partial elevation and partial horizontal section of the cleaning device, to an enlarged scale.

Referring to FIGS. 1 and 2, the cleaner has a hollow body 1, in the form of two portions separable along a plane parallel to their major faces, similar to or identical with a cartridge body as used for a magnetic tape, except as otherwise described below. At one lateral face there is provided a recessed area 2 and camming surfaces 3 to coact with the conventional spring-loaded roller 4 which serves to drive the body fully "home" in a passage 5 in a tape cartridge player 6, and to keep it resiliently retained in the "playing" position (see FIG. 1).

The leading end 7 of the body 1 is apertured at positions 8 and 9 corresponding respectively to the usual magnetic tape player head 10 and to the usual capstan 11. An adjustable stop 12 limits the entry of the body 1 into the player.

Within the body 1 there are provided two laterally spaced columns 13 which are received in respective longitudinal slots 14 in a rigid support block 15 thereby to guide the support block 15 in a linear movement as the support block is reciprocated in the direction of the arrow in FIG. 2. On the edge 16 of the support block 15 presented towards the head 10 and the capstan 11 there is provided a wiping element 17 of felt strip or the like mounted upon a strip 18 of resilient porous material such as polyurethane sponge. The rigid support block 15 has a cavity 19 to receive a supply of a cleaning liquid, and three holes 20 are provided in a wall of said cavity to permit passage of cleaning liquid from the cavity 19 to the felt strip 17, through the porous resilient material 18. For insertion of the cleaning liquid into the cavity of the support block, the latter is provided in its upper wall with a small filler opening 21 which can be closed by a bung or by a pivoted shutter or the like (not shown). For ease of access to the filler opening 21, there is provided in the top wall 22 of the cartridge body 1 a somewhat larger aperture 23 through which the closure (not shown) can be removed or moved aside with the fingers.

For reciprocating the cleaner element 17, there is provided a two-arm lever 24 mounted in the body by a pivot 25 having its axis normal to the major surfaces of the body. One arm 26 of the lever engages at its end into a recess in the rigid support block 15, and the free end of the other arm 27 of the lever terminates in a serrated knob or enlargement 28 which lies at about the level of an opening 29 in the trailing end of the body 1 and can be actuated with a finger. The lever 24 is loaded in one direction of pivoting by means of a blade spring 30 positioned in the body to act between the second arm and the wall of the body.

The corner of the body which is defined between the leading face 7 and that lateral wall 31 which coacts with the spring roller 4 is formed, as in the conventional cartridge, with an inclined lead-in surface 32 facilitating pushing of the leading end of the cartridge past the roller 4. The leading end of the body also coacts with a conventional microswitch 33 controlling operation of the capstan.

With such a device, the operation is as follows:
The body 1 of the cleaning device is inserted into the passage 5 of the magnetic tape cartridge player 6, and is thrust fully home so that the spring-loaded roller 4 retains it firmly in the "playing" position (FIG. 1). The movement of the body 1 into the fully home position causes actuation of the micro-switch 33 and the capstan 11 starts to revolve. The lever 24 is then actuated with the finger, causing the wiping element 17 to be reciprocated across the face of the or each magnetic playing head 10, and also past the revolving capstan 11. Cleaning liquid is present on the absorbent wiping element 17, having passed from the cavity 19 in the rigid support, through the wall openings 20 and the absorbent material 18. The natural resilience of the porous material 18 keeps the wiping element 17 in firm contact with the head(s) 10 and the capstan 11. When sufficient wiping action has been obtained, the body 1 is withdrawn from the passage 5 of the player 6, and the micro-switch 33 turns off the capstan drive once more.

Figure 3:
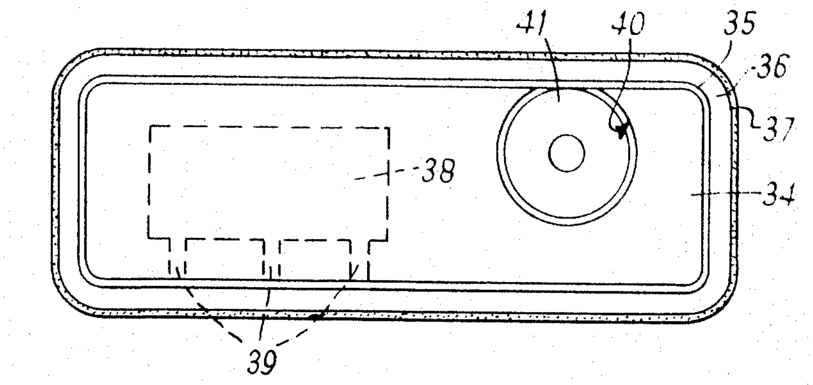
FIG. 3 is a plan view of part of a second embodiment of cleaner, utilising liquid.

Referring now to FIG. 3 there is shown a second embodiment having a body similar to the body 1 of FIGS. 1 and 2, but wherein the support block and lever are replaced by a fixed support block 34 of rectangular shape and with rounded corners. About the block there is engaged slidably a cleaning tape assembly composed of an inner strip 35 of porous fabric, an intermediate strip 36 of absorbent spongy material such as polyurethane, and an outer wiper strip 37 of porous felt. Within the support body 34 there is a cavity 38 from which three outlet holes 39 lead a cleaning liquid to the tape assembly. In the support block 34 there is formed a part-circular recess 40 in which there is disposed, with clearance, a pinch-wheel 41 adapted to coact with the usual capstan drive of the player for driving along the tape assembly pinched between the two.

Figure 4:
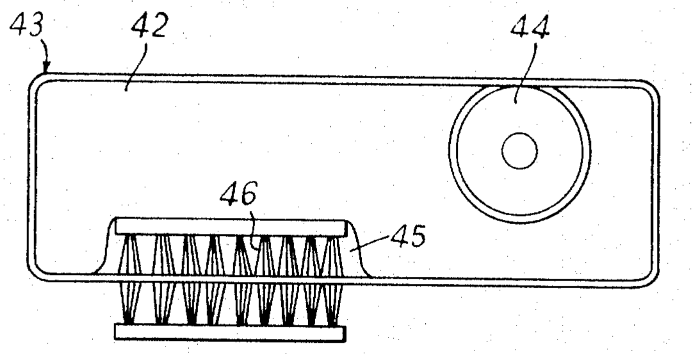
FIG. 4 is a plan view of part of a third embodiment of cleaner which operates dry.

Referring now to FIG. 4, there is shown a third embodiment again having a body similar to the body 1 of FIG. 1, but wherein the support block and lever are replaced by a fixed support 42 about which there is disposed slidably a linen or other fabric tape 43 which can be driven by becoming pinched between a pinch-wheel 44 and the usual capstan drive of the player. In the support 42 there is provided a recess 45 receiving a first set 46 of nylon bristles bearing against one face of the tape. A second set 47 of such bristles bears against the other face of the tape.

We claim:

1. A device, for cleaning tape-coacting operative portions of a magnetic tape cartridge player of that kind which includes at least a cartridge-receiving passage in which said operative portions are disposed and which may further include means for retaining a cartridge in fully inserted position in said cartridge-receiving passage, said device comprising in combination a body adapted for insertion into said cartridge-receiving passage of said player and having a leading end and a trailing end, guide means in said body, a movable support positioned adjacent to said leading end of said body, said support engaging said guide means and being guided in reciprocable manner thereby, linearly movable reciprocable cleaning means positioned on said support whereby when said body is inserted by its leading end in said cartridge-receiving passage said cleaning means abuts against said operative portions of the player, and operating means unitarily mounted in said body coupled to said support and emerging at the trailing end of said body to permit manual linear reciprocation of said support and said cleaning means.

2. A device, as claimed in claim 1, comprising spring-loading means in said body acting between said body and said support to urge said support into one end position of its reciprocating movement.

3. A device, as claimed in claim 1, wherein said cleaning means comprises a felt strip and a layer of porous resiliently-compressible material, said felt strip being at least partly supported on said layer.

4. A device, as claimed in claim 1, wherein said body includes means for coacting with said means for retaining a cartridge in fully inserted position, such that said body may be retained thereby in fully inserted position.

* * * * *